(12) United States Patent
Januskevicius et al.

(10) Patent No.: US 12,069,030 B2
(45) Date of Patent: *Aug. 20, 2024

(54) DYNAMIC MANAGEMENT OF SERVERS BASED ON ENVIRONMENTAL EVENTS

(71) Applicant: UAB 360 IT, Vilnius (LT)

(72) Inventors: Jovaldas Januskevicius, Kaunas (LT); Karolis Pabijanskas, Vilnius (LT)

(73) Assignee: UAB 360 IT, Vilnius (LT)

(*) Notice: Subject to any disclaimer, the term of this patent is extended or adjusted under 35 U.S.C. 154(b) by 0 days.

This patent is subject to a terminal disclaimer.

(21) Appl. No.: 17/994,317

(22) Filed: Nov. 26, 2022

(65) Prior Publication Data

US 2024/0179128 A1 May 30, 2024

Related U.S. Application Data

(63) Continuation of application No. 17/994,258, filed on Nov. 25, 2022.

(51) Int. Cl.
*H04L 9/40* (2022.01)
*H04L 12/46* (2006.01)
*H04L 67/1001* (2022.01)

(52) U.S. Cl.
CPC ...... *H04L 63/0272* (2013.01); *H04L 12/4641* (2013.01); *H04L 67/1001* (2022.05)

(58) Field of Classification Search
CPC ..... H04L 67/60; H04L 47/70; H04L 63/0272; H04L 67/1001; H04L 12/4641; G06F 9/5083
See application file for complete search history.

(56) References Cited

U.S. PATENT DOCUMENTS

| | | | |
|---|---|---|---|
| 7,571,343 B1* | 8/2009 | Xiang | H04L 63/0272 714/2 |
| 11,271,858 B1 | 3/2022 | Pabijanskas et al. | |
| 11,297,038 B1 | 4/2022 | Kolaitis et al. | |
| 11,297,039 B1 | 4/2022 | Celiesius | |
| 2021/0314390 A1* | 10/2021 | Derome | G06F 11/1662 |

* cited by examiner

*Primary Examiner* — Esther B. Henderson
(74) *Attorney, Agent, or Firm* — The Pattani Law Group

(57) ABSTRACT

A method including predicting or determining, by a VPN server, potential overloading of the VPN server based on predicting or determining a breach of a critical threshold associated with the VPN server; verifying, by the VPN server based on predicting or determining the potential overloading, an identity of a secondary server with which the VPN server is authorized to establish a secure connection; establishing, by the VPN server based on verifying the identity of the secondary server, a secure connection with the secondary server to enable communication of encrypted information between the VPN server and the secondary server; and transmitting, by the VPN server to the secondary server, an encrypted message identifying a host device and data of interest to be retrieved from the host device to enable the secondary server to request the data of interest from the host device is disclosed. Various other aspects are contemplated.

20 Claims, 8 Drawing Sheets

DYNAMIC MANAGEMENT OF SERVERS BASED ON ENVIRONMENTAL EVENTS

CROSS REFERENCE

This application is a continuation of U.S. Non-Provisional patent application Ser. No. 17/994,258, filed on Nov. 25, 2022, and titled "Dynamic Management Of Servers Based On Environmental Events," the entire contents of which are incorporated herein by reference.

FIELD OF DISCLOSURE

Aspects of the present disclosure generally relate to a network infrastructure management, and more particularly to dynamic management of servers based on environmental events.

BACKGROUND

Global internet users increasingly rely on network services to store, manipulate, present, and communicate data in a secure way.

Users may rely on data storage services and various methods of cryptography (e.g., encrypting and decrypting data). Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

Users may rely on VPN services to communicate data and preserve their privacy, circumvent censorship, and/or access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, Wireguard, and IKEv2.

SUMMARY

In one aspect, the present disclosure contemplates a method including utilizing, by a VPN server during an established VPN connection between the VPN server and a user device, a first exit internet protocol (IP) address to transmit a first query to a host device for retrieving data of interest requested by the user device; predicting or determining, by the VPN server during the established VPN connection, potential overloading of the VPN server based at least in part on predicting or determining a breach of a critical threshold associated with the VPN server; establishing, by the VPN server during the established VPN connection and based at least in part on predicting or determining a breach, a secure connection with a secondary server to enable communication of encrypted information between the VPN server and the secondary server; and transmitting, by the VPN server during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address.

In another aspect, the present disclosure contemplates a device associated with a virtual private network (VPN), the device comprising a memory; and a processor communicatively coupled to the memory, the processor being configured to: utilize, during an established VPN connection between the VPN server and a user device, a first exit internet protocol (IP) address to transmit a query to a host device for requesting data of interest requested by the user device; predict or determine, during the established VPN connection, potential overloading of the VPN server based at least in part on predicting or determining a breach of a critical threshold associated with the VPN server; establish, during the established VPN connection and based at least in part on predicting or determining a breach, a secure connection with a secondary server to enable communication of encrypted information between the VPN server and the secondary server; and transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address.

In another aspect, the present disclosure contemplates a non-transitory computer readable medium storing instructions, which when executed by a processor configure the processor to: utilize, during an established VPN connection between the VPN server and a user device, a first exit internet protocol (IP) address to transmit a query to a host device for requesting data of interest requested by the user device; predict or determine, during the established VPN connection, potential overloading of the VPN server based at least in part on predicting or determining a breach of a critical threshold associated with the VPN server; establish, during the established VPN connection and based at least in part on predicting or determining a breach, a secure connection with a secondary server to enable communication of encrypted information between the VPN server and the secondary server; and transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
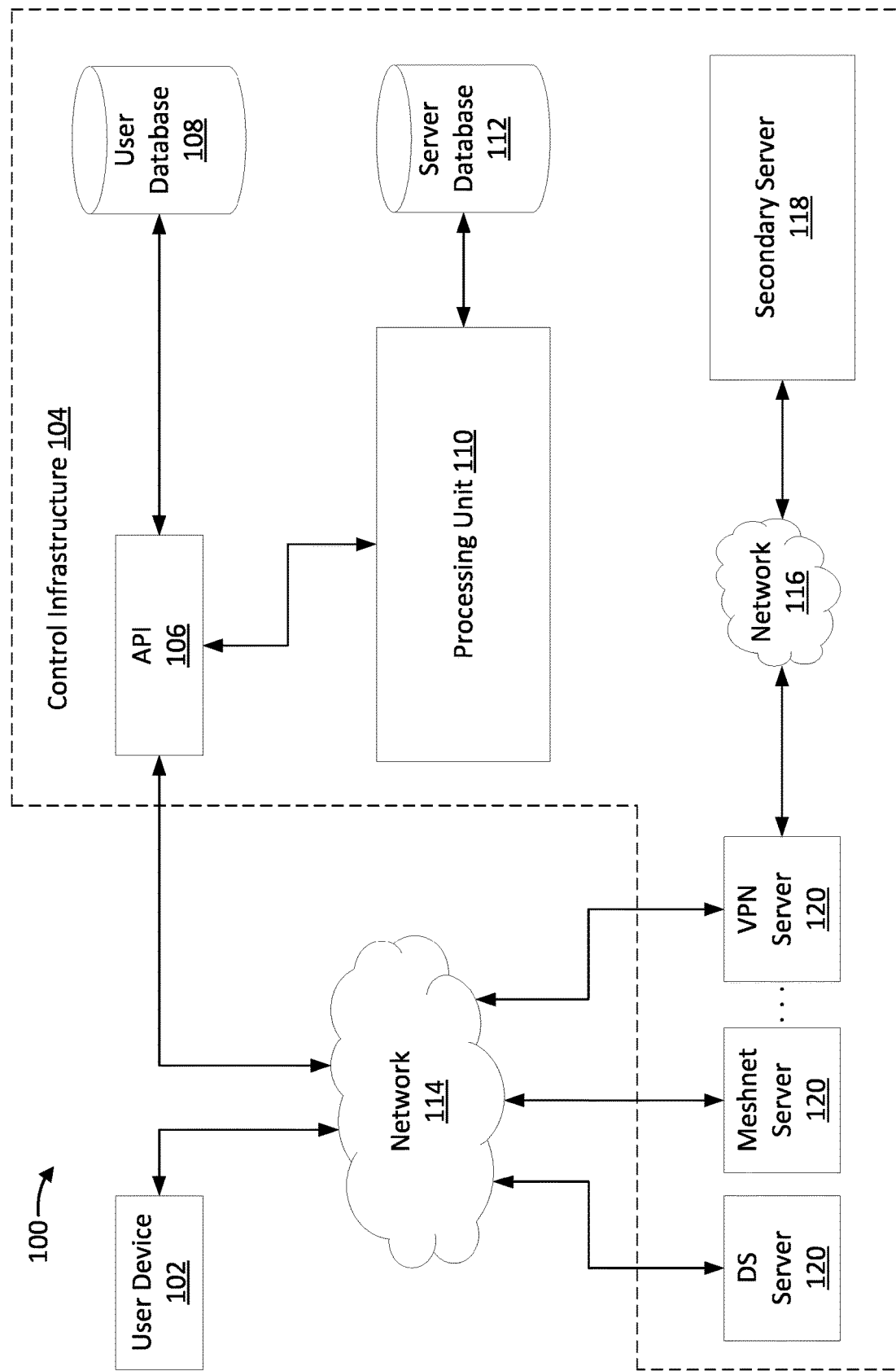

FIG. 1 is an illustration of an example system associated with dynamic management of servers based on environmental events, according to various aspects of the present disclosure.

Figure 2:
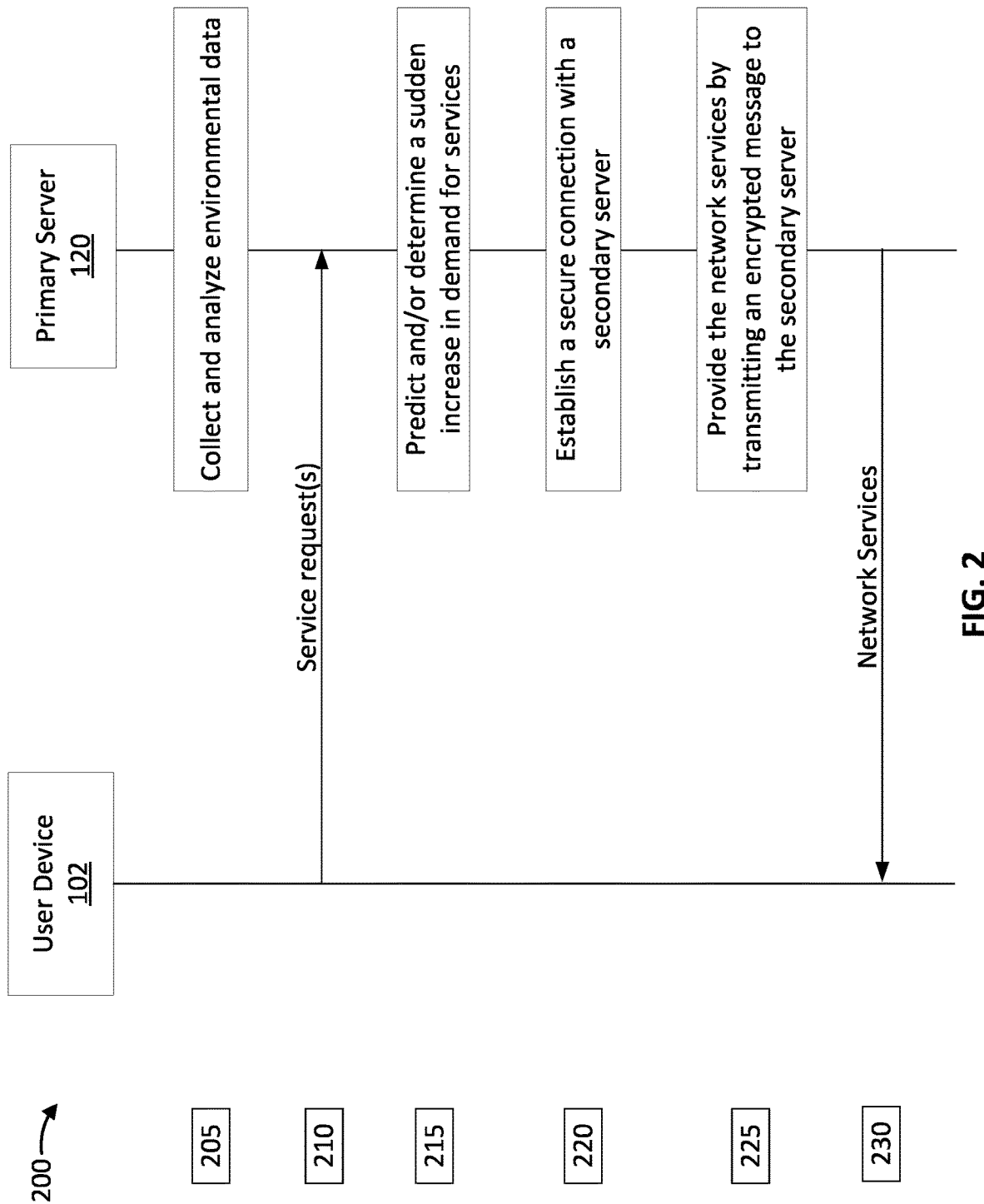

FIG. 2 is an illustration of an example flow associated with dynamic management of servers based on environmental events, according to various aspects of the present disclosure.

Figure 3:
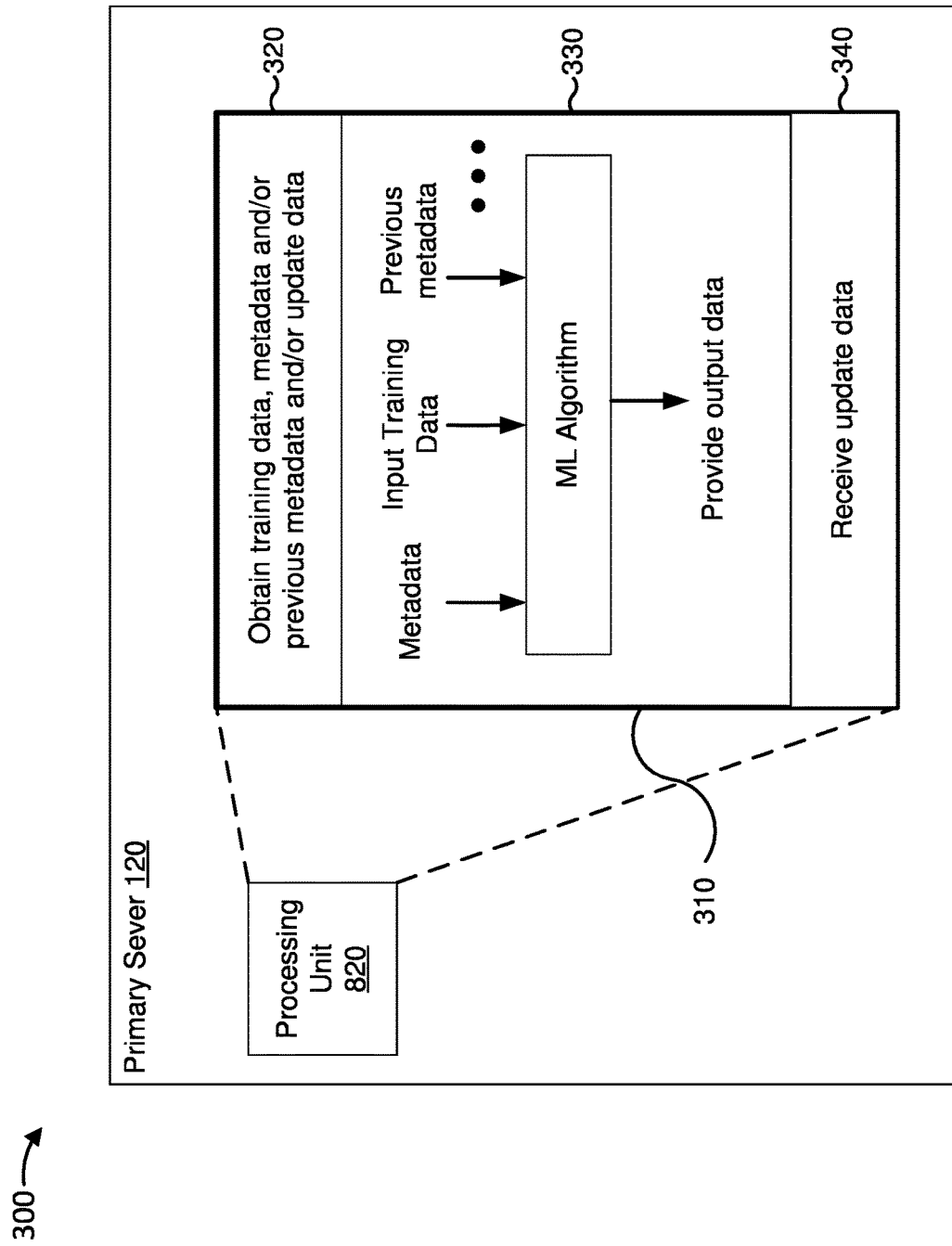

FIG. 3 is an illustration of an example associated with dynamic management of servers based on environmental events, according to various aspects of the present disclosure.

Figure 4:
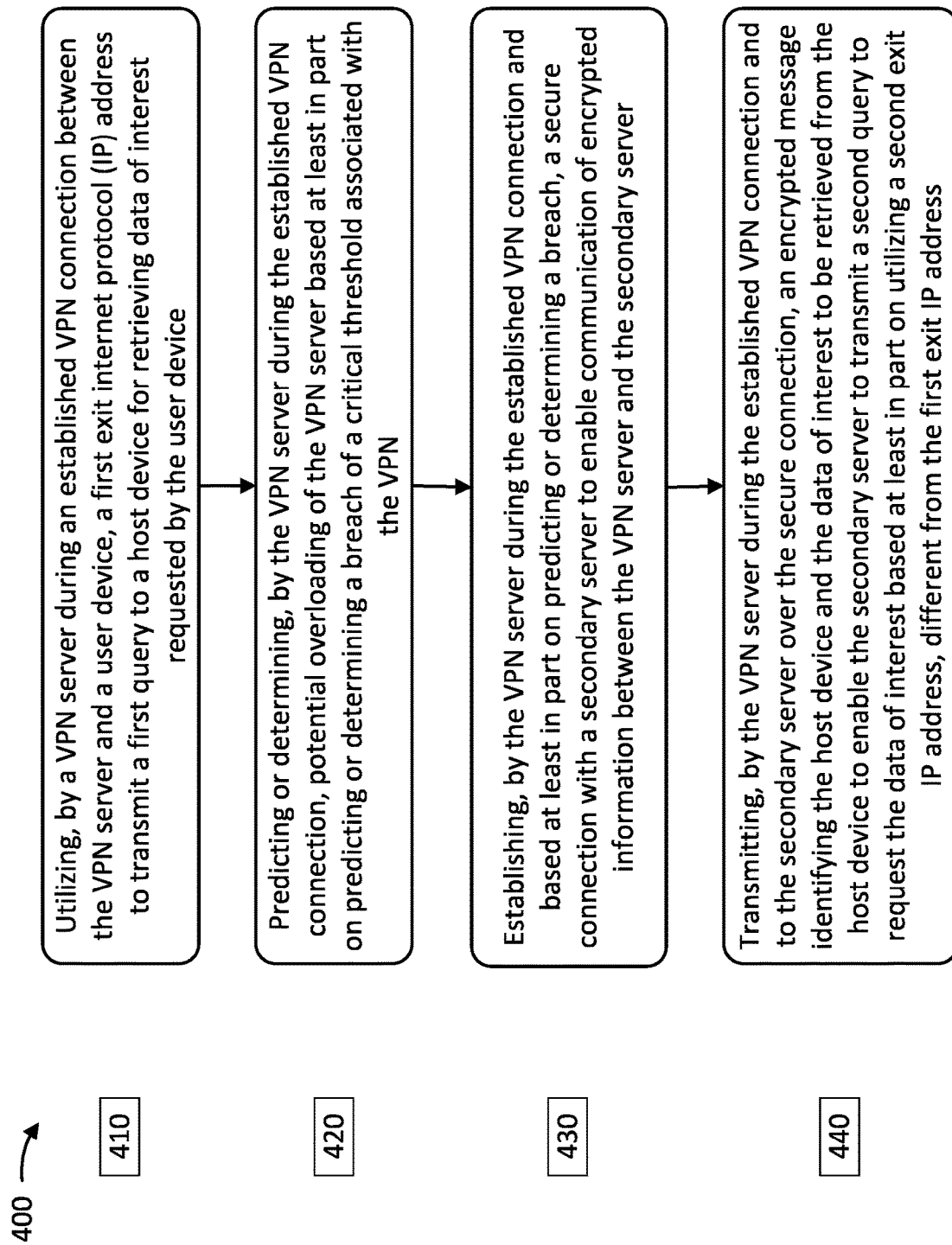

FIG. 4 is an illustration of an example process associated with dynamic management of servers based on environmental events, according to various aspects of the present disclosure.

Figure 5:
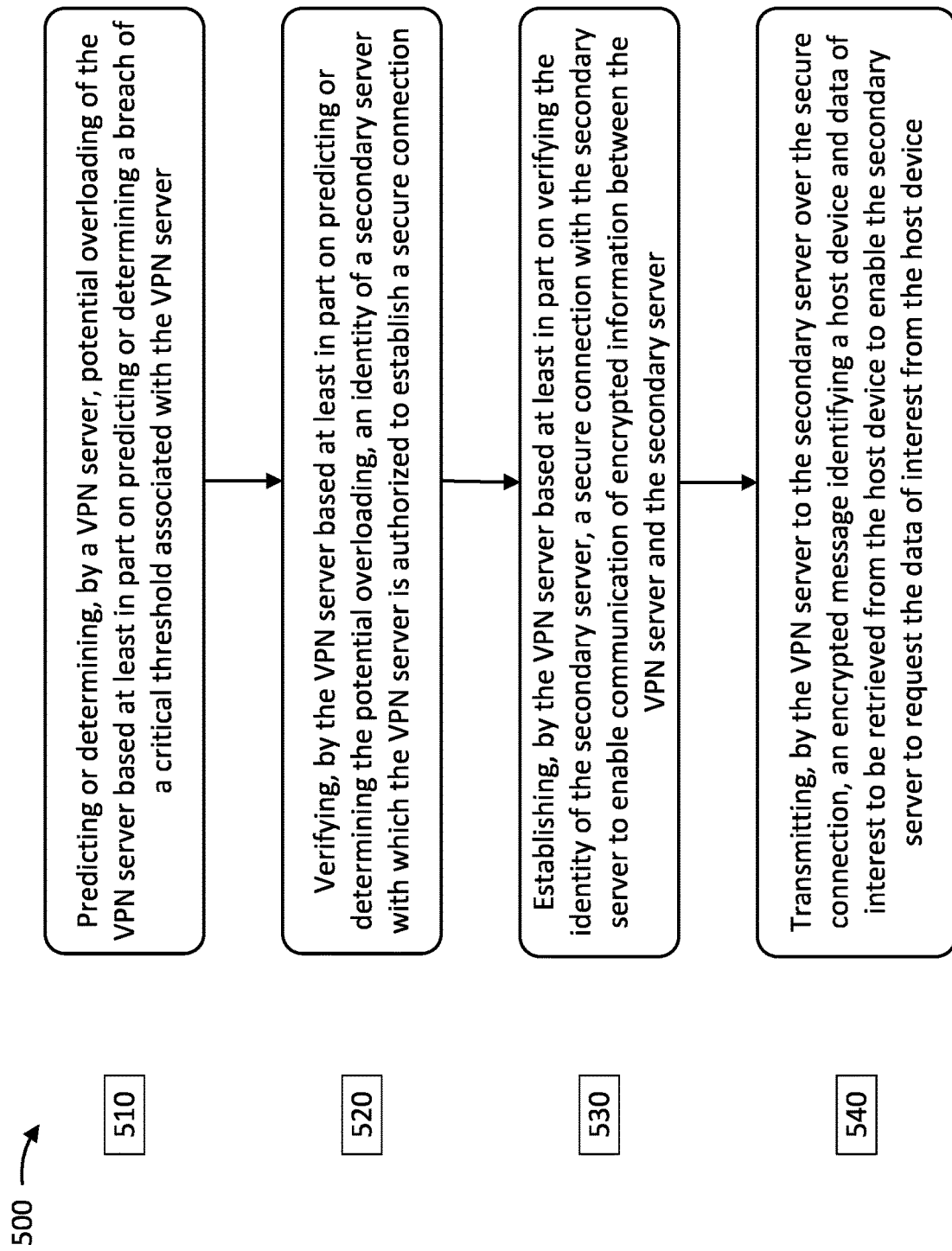

FIG. 5 is an illustration of an example process associated with dynamic management of servers based on environmental events, according to various aspects of the present disclosure.

Figure 6:
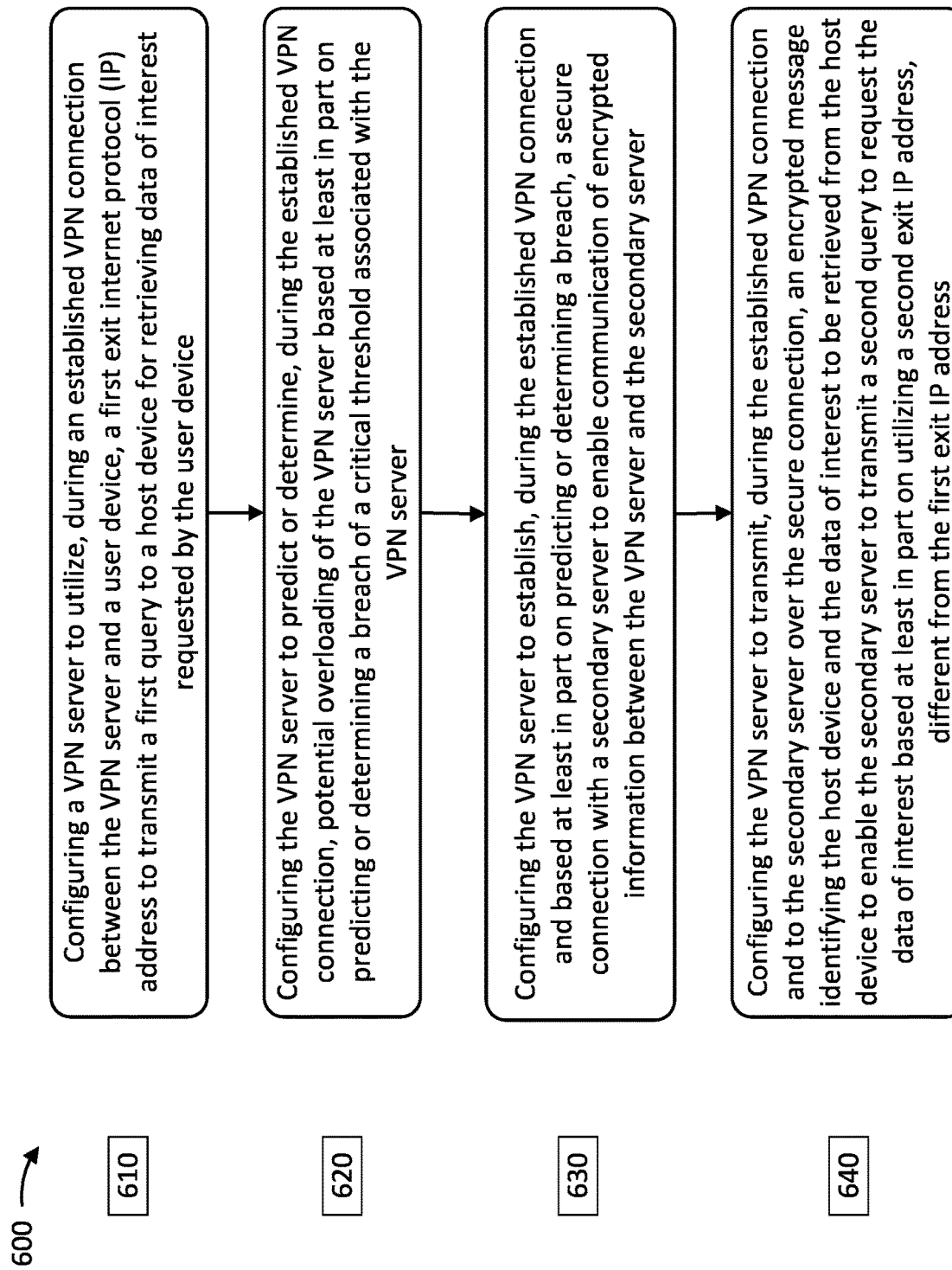

FIG. 6 is an illustration of an example process associated with dynamic management of servers based on environmental events, according to various aspects of the present disclosure.

Figure 7:
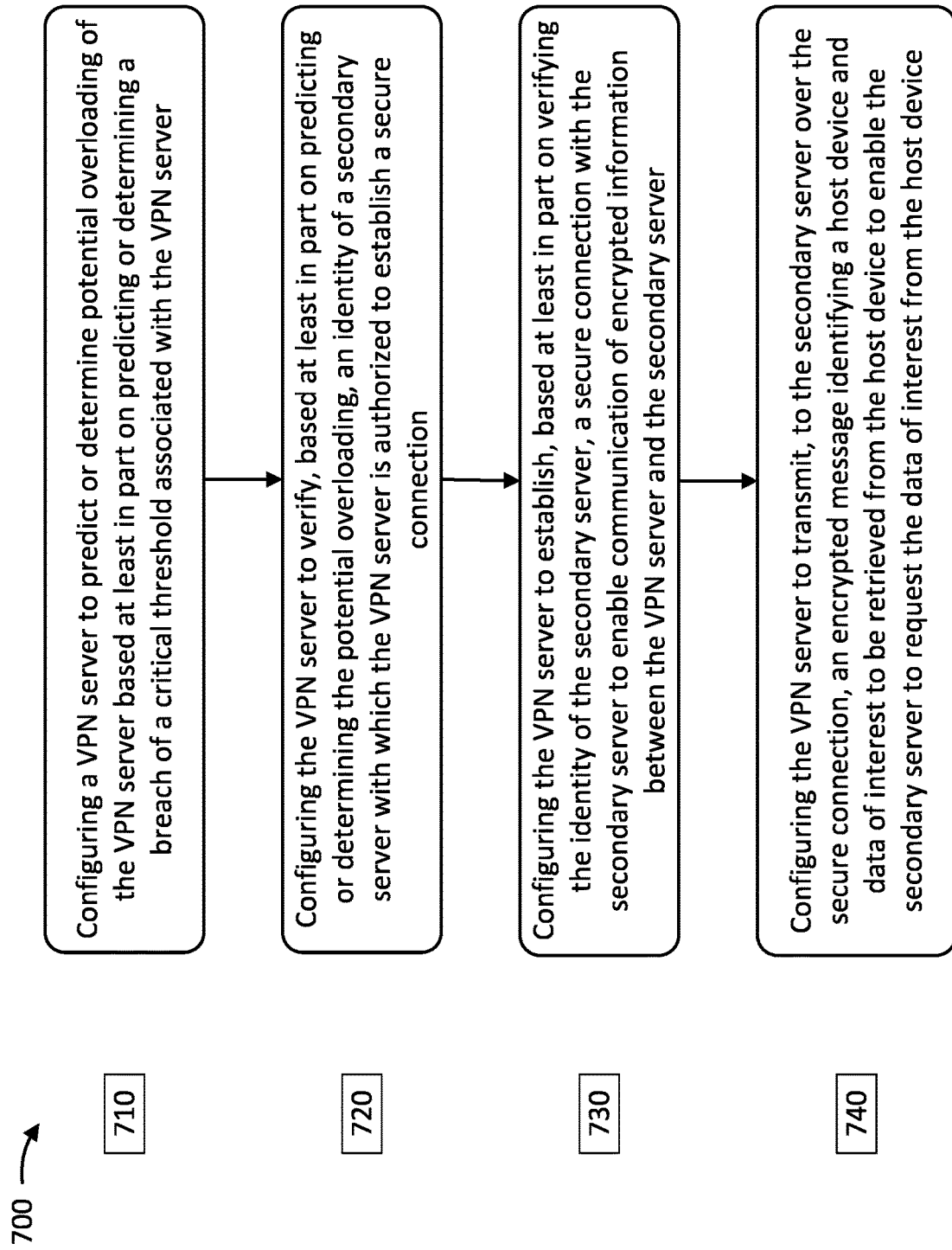

FIG. 7 is an illustration of an example process associated with dynamic management of servers based on environmental events, according to various aspects of the present disclosure.

Figure 8:
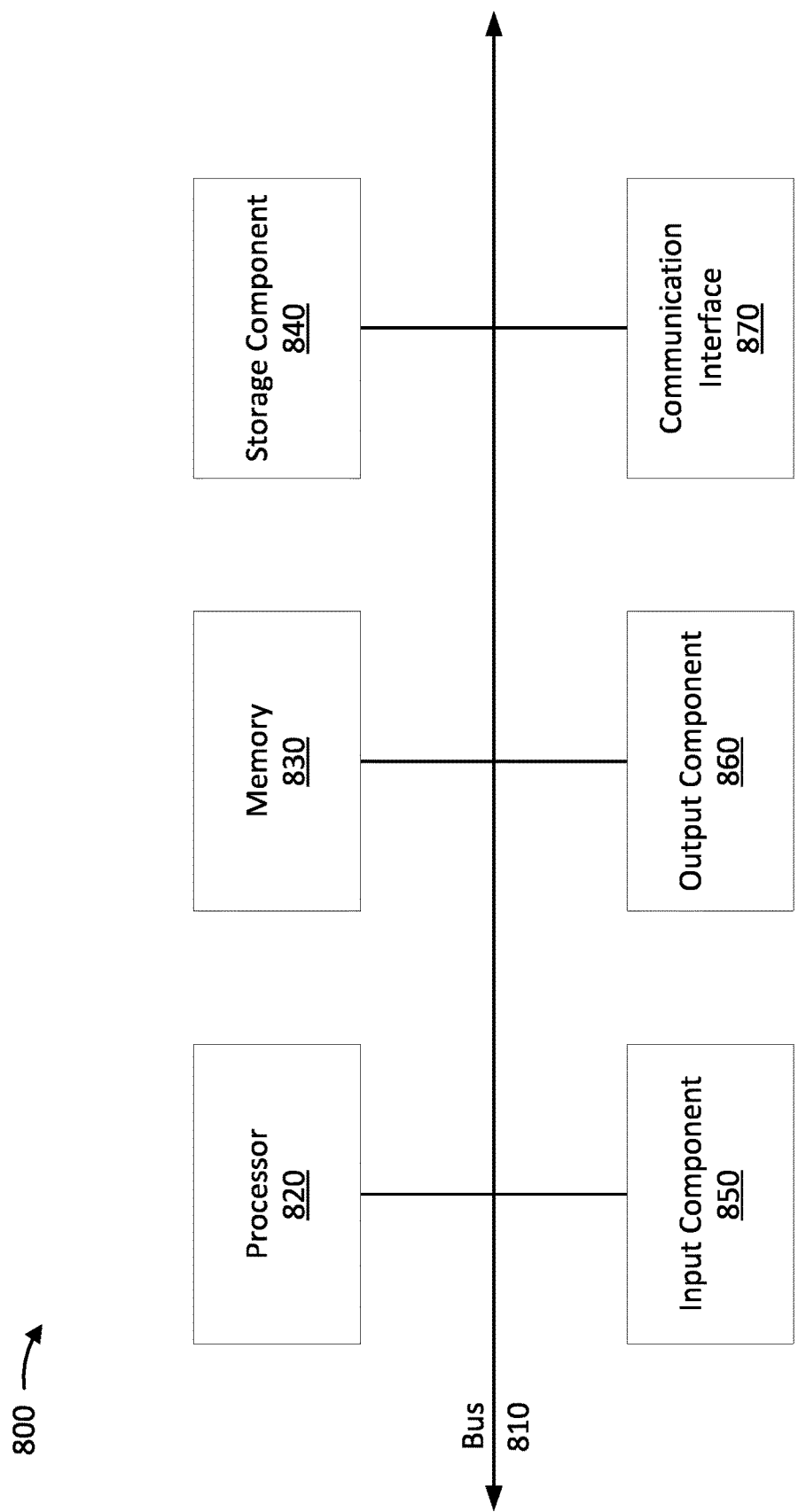

FIG. 8 is an illustration of example devices associated with dynamic management of servers based on environmental events, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with dynamic management of servers based on environmental events, according to various aspects of the present disclosure. Example 100 shows an architectural depiction of components included in system 100. In some aspects, the components may include a user device 102 capable of communicating with a control infrastructure 104 and with one or more servers 120 over a network 114 for receiving network services. In an example, the servers 120 may include a data storage (DS) server for providing data storage and protection services, a meshnet server for providing meshnet services, and/or a VPN server for providing VPN services. The control infrastructure 104 may be controlled by a service provider and may include an application programming interface (API) 106, a user database 108, processing unit 110, a server database 112, and the one or more servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more servers 120 over the network 114. The processing unit 110 may be capable of configuring and controlling operation of the one or more servers 120. The DS servers 120 may be configured to store and/or protect data. The meshnet servers 120 may configured to enable a meshnet including one or more user devices. The VPN servers 120 may be configured to communicate with one or more host devices over a network 116 to, for example, request and retrieve data of interest. Further, as shown in FIG. 1, the servers 120 may be configured to communicate with one or more secondary servers 118 in connection with providing the network services. The servers 120 may also be configured to communicate with an authentication server over the network. The processing unit 110 may be capable of configuring and controlling operation of the authentication server. In some aspects, the network 116 may be similar to network 114.

The user device 102 may be a physical computing device capable of hosting a client application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IOT) devices such as VSP smart home appliances, smart home security systems, autonomous vehicles, smart health monitors, smart factory equipment, wireless inventory trackers, biometric cyber security scanners, or the like. The network 114 may be any digital telecommunication network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The control infrastructure 104 may include a combination of hardware and software components that enable provision of the network services to the user device 102. The control infrastructure 104 may interface with (the client application on) the user device 102 via the API 106, which may include one or more endpoints to a defined request-response message system. In some aspects, the API 106 may be configured to receive, via the network 114, a connection request from the user device 102 to establish a connection with a server 120. The connection request may include an authentication request to authenticate the user device 102 and/or a request for an IP address of an optimal server for establishment of the connection therewith. In some aspects, an optimal server may be a single server 120 or a combination of one or more servers 120. The API 106 may receive the authentication request and the request for an IP address of an optimal server in a single connection request. In some aspects, the API 106 may receive the authentication request and the request for an IP address of an optimal server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The network service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the network service provider may enable the user device 102 to obtain the network services. When the received credentials fail to match at least one of the valid credentials, the user database 108 and the processor may fail to authenticate the user device 102. In this case, the network service provider may decline to provide the network services to the user device 102.

When the user device 102 is authenticated, the user device 102 may initiate a connection and may transmit to the API 106 a request for an IP address of an optimal server. The processing unit 110 included in the control infrastructure may be configured to determine/identify a single server 120 as the optimal server or a list of servers. The processing unit 110 may utilize the API 106 to transmit the IP address of the optimal server or IP addresses of the servers 120 included in the list to the user device 102. In the case where the list of IP addresses of the servers 120 is provided, the user device 102 may have an option to select a server 120 from among the listed servers as the optimal server 120.

In some aspects, the processing unit 110 may be a logical unit including a scoring engine. The processing unit 110 may include a logical component configured to perform complex operations to compute numerical weights related to various factors associated with the servers 120. The scoring engine may likewise include a logical component configured to perform arithmetical and logical operations to compute a server penalty score for one or more of the servers 120. In some aspects, based at least in part on server penalty scores calculated utilizing the complex operations and/or the arithmetical and logical operations, the processing unit 110 may determine an optimal server. In one example, the processing unit 110 may determine the server 120 with the lowest server penalty score as the optimal server. In another example, the processing unit 110 may determine the list of optimal servers by including, for example, three (or any other number) servers 120 with the three lowest server penalty scores.

The user device 102 may transmit to the optimal server an initiation request to establish a connection (e.g., an encrypted tunnel in case of a VPN) with the optimal server. The optimal server with which the user device establishes the connection may be referred to as a primary server. Based at least in part on receiving the initiation request, the optimal server may conduct an authentication with the authentication server to authenticate the user device 102 as a device that may receive the network services from the optimal server. When the authentication is successful, the optimal server may proceed to provide the network services to the user device 120. Alternatively, when the authentication fails, the optimal server may refrain from providing the services to the user device 120 and/or may communicate with the user device 120 to obtain additional information to authenticate the user device 102.

In some aspects, a server 120 may include a piece of physical or virtual computer hardware and/or software capable of securely communicating with (the application on) the user device 102 for provision of services. Similarly, the authentication server may include a piece of physical or virtual computer hardware and/or software capable of securely communicating with one or more servers 120 for provision of authentication services.

The host device may include a type of server that hosts or houses websites and/or related data, applications, and/or services. The host device may be a remotely accessible Internet server with complete Web server functionality and resources. In some aspects, the host device may be referred to as a Web hosting server.

In some aspects, the one or more secondary servers 118 may include one or more servers 120. In some aspects, the one or more secondary servers 118 may include one or more servers configured and/or programmed with available exit IP addresses. The one or more secondary servers may include a processor communicatively coupled with, among other things, a volatile memory, a non-volatile memory, and a communication interface to enable a network connection. Further, the one or more secondary servers 118 may be configured and/or programmed to enable secure connections involving encryption and decryption of data.

One or more components (e.g., API 106, user database 108, processing unit 110, server database 112, secondary server 118, and/or servers 120) included in the control infrastructure 104 and/or components (e.g., processing unit, memory, communication interface, etc.) included in the user device 102 and/or components (e.g., processing unit, memory, communication interface, etc.) may further be associated with a controller/processor, a memory, a communication interface, or a combination thereof (e.g., FIG. 8). For instance, the one or more components may include or may be included in a controller/processor, a memory, or a combination thereof. In some aspects, the one or more components may be separate and distinct from each other. Alternatively, in some aspects, one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A user device may seek to obtain network services from a control infrastructure. Based at least in part on authentication of the user device, the control infrastructure may select a primary server to provide the network services to the user device. In an example, the control infrastructure may provide the user device with an entry IP address associated with the primary server. The user device may utilize the entry IP address to communicate and establish a connection with the primary server.

During the established connection (e.g., while the connection remains established), the primary server may utilize the entry IP address to process requests received from the user device. In a case where the primary server is a VPN server and the connection is a VPN connection, during the established connection, the VPN server may utilize the entry IP address to receive a data request from the user device for retrieving data of interest from a host device and may utilize the exit IP address to retrieve the data of interest from the host device. Utilizing the exit IP address may include the VPN server utilizing the exit IP address to communicate (e.g., transmit and/or receive communications) with the host device to retrieve the data of interest. Further, the VPN server may utilize a correlation between the exit IP address and the entry IP address to transmit the retrieved data of interest to the user device.

In some cases, while providing the network services, the primary server may experience a sudden and unexpected increase in demand for the network services. In an example, one or more user devices having respective established connections with the primary server may transmit an increased number of data requests. The increased number of data requests may be associated with, for example, an environmental event such as a social event (e.g., a popular sporting event, a popular music concert, etc.) or a political event (e.g., start of a war between countries, death of a political figure, etc.) or a natural event (e.g., an earthquake, hurricane, etc.). In another example, while providing the network services, the primary server may experience a sudden and unexpected increase in a number of user devices establishing the respective connections with the primary server. The increase in the number of user devices may also be due to an increase in the number of user devices seeking the network services from the primary server because another server that was previously providing the network services to the user devices may experience a sudden shutdown (e.g., power outage, server malfunction, etc.). In a case where the primary server is a VPN server and the connection is a VPN connection (e.g., encrypted tunnel), the increase in the number of user devices may be due to an increase in a number of user devices seeking VPN services to receive data of interest, which the number of user devices may have been blocked (e.g., geographical blocking, ISP blocking, etc.) from receiving via other avenues.

In such situations, the primary server may become overloaded based at least in part on experiencing the sudden and unexpected increase in demand for the network services. As a consequence, the primary server may experience a reduction in an amount of bandwidth available for providing the network services to the one or more user devices, thereby resulting in the one or more users receiving degraded service from the primary server. Also, components associated with the primary server may experience stress (e.g., overheating, etc.), thereby causing damage to the primary server. In some cases, the control infrastructure and/or the primary server may rely on human intervention to predict the sudden and unexpected increase in demand for the network services. However, relying on human intervention may be infeasible because it may be difficult for a human to analyze the amount of data required to predict the sudden and unexpected increase in demand for the network services. Further, adequate analysis by a human may be time consuming and unreliable for being error-prone for various reasons (e.g., fatigue, other higher-priority tasks, etc.).

To avoid providing degraded service and/or causing damage, the primary server may terminate one or more established connections. In this case, provision of the network services to one or more user devices may be interrupted and the one or more users may be required to reestablish respective connections. Conducting restorative operations to manage the reduction in the amount of available bandwidth, the damage to the primary server, the termination of established connections, and/or the reestablishment of connections may inefficiently consume infrastructure resources (e.g., computational resources, management resources, processing power, memory utilization, network bandwidth, etc.) and user device resources (e.g., processing power, memory utilization, power consumption, battery life, etc.) that may otherwise be utilized for performing suitable tasks.

Various aspects of systems and techniques discussed in the present disclosure enable dynamic management of servers based on environmental events. In some aspects, a user device may establish a connection with a primary server configured by a control infrastructure to provide network services to the user device. During the established connection, the techniques discussed herein may enable the primary server to predict occurrence of an environmental event that may lead to a sudden increase in demand for the network services from the primary server. In some aspects, the primary server may be configured to utilize a machine learning (ML) model to predict the sudden increase in demand for the network services. Further, the techniques discussed herein may enable the primary server to determine, during the established connection, occurrence of the environmental event indicating the sudden increase in demand for the network services. When the primary server predicts and/or determines the sudden increase in demand for the network services, during the established connection, the primary server may automatically (e.g., without human intervention), and in real time, utilize a secondary server to assist with providing the network services. In this case of a VPN, the primary VPN server may establish a secure connection with the secondary server, and route a received data request via the secondary server to a host device. The secondary server may utilize a new exit IP address, associated with the secondary server, to retrieve the data of interest from the host device and transmit the retrieved data of interest to the primary VPN server, which, in turn, may transmit the received data of interest to the user device. As such, the primary server may establish a secure connection with a secondary server to share a load associated with providing the network services. In this way, the control infrastructure and/or the primary server may avoid having to conduct restorative operations associated with managing a reduction in an amount of available bandwidth and/or damage to the server while enabling connected user devices to receive the data of interest without, among other things, disconnecting established connections and reestablishing new connections. As a result, the control infrastructure and/or the primary server may enable efficient utilization of user device resources (e.g., processing resources, memory resources, power consumption resources, battery life, or the like) and infrastructure resources (computational resources, network bandwidth, management resources, processing resources, memory resources, or the like) for performing suitable tasks.

In some aspects, when the primary server includes a VPN server, a processor (e.g., processor 720) associated with the VPN server may utilize, during an established VPN connection between the VPN server and a user device, a first exit internet protocol (IP) address to transmit a query to a host device for requesting data of interest requested by the user device; predict or determine, during the established VPN connection, potential overloading of the VPN server based at least in part on predicting or determining a breach of a critical threshold associated with the VPN server; establish, during the established VPN connection and based at least in part on predicting or determining a breach, a secure connection with a secondary server to enable communication of encrypted information between the VPN server and the secondary server; and transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address.

In the case of a VPN, utilizing an exit IP address by a server (e.g., primary server, secondary server, etc.) may be associated with the server selecting and/or assigning the exit IP address to a user device during an established connection between the user device and the primary server. The exit IP address may be selected from a pool of exit IP addresses available to the server. In some aspects, a first exit IP address may be assigned to a user device to be utilized by the primary server to process a data request. Based at least in part on predicting a sudden increase in demand for network services and/or determining a sudden increase in demand for the network services, during the established connection, the primary server may utilize a new, second exit IP address to provide the network services. The second exit IP address may be associated with a secondary server. In this case, the second exit IP address may be selected and/or assigned by the secondary server to provide the network services. In case of a VPN, providing the network service may involve requesting and retrieving, from a host device, data of interest associated with or requested via the data request.

FIG. 2 is an illustration of an example flow 200 associated with dynamic management of servers based on environmental events, according to various aspects of the present disclosure. Example flow 200 includes a user device 102 in communication with a primary server 120. In some aspects, the user device 102 may communicate with the primary server 120 over a network (e.g., network 114). In some aspects, the servers may include the control infrastructure, the primary server 120, and/or secondary servers.

The management of servers will now be discussed with respect to the primary server being a VPN server. However, the present disclosure contemplates the primary server being a DS server and/or a meshnet server that is configured to operate in a similar and/or analogous manner as the VPN server.

The user device 102 may be in communication with a VPN server 120 based at least in part on utilizing an entry IP address to establish a VPN connection with the VPN server 120. In some aspects, the established VPN connection may use a VPN protocol such as, for example, Wireguard, IKEv2, OpenVPN, or the like. Based at least in part on the VPN connection being established, the VPN server 120 may assign an exit IP address (e.g., first exit IP address) to the user device 102. In some aspects, the exit IP address may be selected from among a plurality of exit IP addresses included in a pool of exit IP addresses available to the VPN server 120.

In some aspects, the exit IP address may be randomly selected or sequentially selected from among the plurality of exit IP addresses included in the pool of exit IP addresses. Randomly selecting or sequentially selecting an exit IP address may include selecting an exit IP address according to, for example, an inverse sequential order, a random sequential (random but higher) order, a random inverse (random but lower) order, a random non-sequential (random but not next) order, a two-step (random and then next) order, a random including current exit IP address order, a sequential discreet (at least n+2 steps, with n being an integer), and/or a random lower bound (random but only within a upper half, upper quartile, etc.) order.

The VPN server 120 may utilize an nftable firewall to assign exit IP addresses. In some aspects, the control infrastructure 104 (e.g., processing unit 110) may program the nftables with respect to assignments of exit IP addresses to user devices. The control infrastructure 104 may configure the VPN server to select and/or assign exit IP addresses randomly or to select and/or assign exit IP addresses sequentially. Based at least in part on assigning the exit IP address to the user device 102, the VPN server 120 may store a correlation between the entry IP address and the exit IP address (that is assigned to the user device 102) in a connection tracking table.

In some aspects, the control infrastructure 104 may configure one or more VPN servers 120, from among the multiple VPN servers 120, to enable dynamic management of VPN devices based on environmental events.

For the dynamic management of servers, as shown by reference numeral 205, the VPN server 120 may collect and analyze environmental data. In some aspects, the VPN server 120 may collect the environmental data periodically (e.g., every 10 seconds, every 30 seconds, every 60 seconds, every 180 seconds, every 300 seconds, etc.). The environmental data may include, for example, data associated with the VPN server 120 providing VPN services during a reference period (e.g., one hour, 12 hours, 1 day, 7 days, 30 days, 6 months, 1 year, etc.). In an example, the VPN server 120 may collect data indicating a distribution of a number of user devices having established VPN connections with (e.g., receiving VPN services from) the VPN server 120 over the reference period. In another example, during the reference period, the VPN server 120 may collect data indicating a distribution of an amount of throughput processed by the VPN server 120 over the reference period. In yet another example, during the reference period, the VPN server 120 may collect behavior information indicating a distribution of an amount of data requests received by the VPN server 120 over the reference period. Based at least in part on collecting such data, the VPN server 120 may determine one or more time intervals during which the VPN server 120 experiences a threshold number of user devices having established VPN connections, and/or a threshold amount of throughput, and/or a threshold amount of data requests that satisfy (e.g., is equal to or greater than) respective threshold amounts.

At a conclusion of the reference period, the VPN server 120 may store the environmental data collected during the reference period in a memory (e.g., memory 830) associated with the VPN server 120. Further, the VPN server 120 may analyze the environmental data to enable prediction and/or determination of a sudden increase in demand for VPN services from the VPN server 120. In an example, based at least in part on analyzing the environmental data, the VPN server 120 may determine patterns indicating that the number of user devices having established VPN connections with the VPN server 120 and/or an amount of throughput processed by the VPN server 120 is higher during a given time of day (e.g., evenings, late-nights, etc.). Similarly, based at least in part on analyzing the environmental data, the VPN server 120 may determine patterns indicating that the number of user devices having established VPN connections with the VPN server 120 and/or an amount of throughput processed by the VPN server 120 is higher during a given time of a week (e.g., weekends, etc.). Also, based at least in part on analyzing the environmental data, the VPN server 120 may determine patterns indicating that the number of user devices having established VPN connections with the VPN server 120 and/or an amount of throughput processed by the VPN server 120 is higher during a given time of a year (e.g., summers, holidays, etc.). Further, based at least in part on analyzing the environmental data, the VPN server 120 may determine patterns that indicate that the number of user devices having established VPN connections with the VPN server 120 and/or an amount of throughput processed by the VPN server 120 is higher during occurrence of a social event, a political event, and/or a natural event.

The VPN server 120 may also determine a critical threshold associated with the VPN server 120 providing the VPN services. In some aspects, the critical threshold may represent an acceptable amount of load on the VPN server 120 to allow the VPN server 120 to adequately and/or satisfactorily provide the VPN services without becoming overloaded.

The VPN server 120 may utilize the determined patterns and the critical threshold to predict the sudden increase in demand for VPN services which may result in the VPN server 120 becoming overloaded. In some aspects, the VPN server 120 may monitor an increase in a rate of a number of user devices currently establishing VPN connections with the VPN server 120 and/or monitor an increase in a rate of an amount of throughput currently being processed by the VPN server 120. The VPN server 120 may compare the monitored rates of increase with the critical threshold. When the VPN server 120 predicts that the rates of increase may result in the critical threshold being breached within a threshold amount of time, the VPN server 120 may predict that the VPN server 120 may experience the sudden increase in demand for VPN services within the threshold amount of time. In some aspects, as discussed below with respect to FIG. 3, the VPN server 120 may utilize a machine learning (ML) model to analyze the collected environmental data and to predict the sudden increase in demand for VPN services.

The VPN server 120 may also utilize the determined patterns and the critical threshold to determine the sudden increase in demand for VPN services such that the VPN server 120 may become overloaded. In some aspects, the VPN server 120 may determine that the critical threshold may be breached when the number of user devices having established VPN connections with the VPN server 120 satisfies (e.g., is equal to or greater than) a critical number (e.g., 80%, 85%, 90%, 95%) of user devices that the VPN server 120 is configured to serve. In another example, the VPN server 120 may determine that the critical threshold may be breached when the amount of throughput processed by the VPN server 120 satisfies (e.g., is equal to or greater than) a critical amount (e.g., 80%, 85%, 90%, 95%) of throughput that the VPN server 120 is configured to process. When the critical threshold is breached during an operation period (e.g., when the VPN server 120 is providing the VPN services to one or more user devices 102), the VPN server 120 may determine that the VPN server 120 has experienced the sudden increase in demand for VPN services.

During the operation period, the VPN server 120 may establish respective VPN connections to VPN services to one or more user devices, and may receive a plurality of data requests from the one or more user devices. For instance, as shown by reference numeral 210, the user device 102 may utilize the entry IP address to transmit a data request to the VPN server 120. In some aspects, the data request may include a request for the VPN server 120 to retrieve and provide data of interest to the user device 102. The data request may include identification information to identify a host device from whom the VPN server 120 is to retrieve the data of interest. In one example, the user device 102 may transmit the data request by utilizing a client application configured and provided by the control infrastructure or a browser installed on the user device 102. In an example, the data request may be associated with initiating a connection with a website on the Internet, and may request the VPN server 120 to retrieve and provide data of interest from the host device that is hosting the website.

Based at least in part on receiving the data request, as shown by reference numeral 210, the VPN server 120 may process the data request by utilizing the assigned exit IP address. The VPN server 120 may utilize an associated domain name services (DNS) server that may return host information (e.g., domain name, IP address, etc.) associated with the host device based at least in part on receiving the identification information. To process the data request, the VPN server 120 may utilize the host information to open a first communication socket between the VPN server 120 and the host device on the open Internet. Further, the VPN server 120 may utilize the assigned exit IP address to transmit a query to the host device for requesting and retrieving the data of interest.

While processing the data request, as shown by reference numeral 215, the VPN server 120 may predict and/or determine the sudden increase in demand for VPN services. In some aspects, as discussed above, based at least in part on the determined patterns and/or the critical threshold being breached, the VPN server 120 may predict and/or determine the sudden increase in demand for VPN services.

Based at least in part on predicting and/or determining the sudden increase in demand for VPN services, the VPN server 120 may automatically, and in real time, suspend utilization of the assigned exit IP address to process the data request, and determine that a new exit IP address is to be utilized to process the data request. During suspension of utilization of the assigned exit IP address, the VPN server 120 may periodically (e.g., every 30 seconds, every 60 seconds, every 3 minutes, every 5 minutes, every 10 minutes, every 30 minutes, every 60 minutes, etc.) determine whether the increase in demand for VPN services still exists. In an example, the VPN server 120 may utilize the determined patterns, as discussed above, to periodically determine whether the increase in demand for VPN services still exists. In another example, the VPN server 120 may determine whether the critical threshold is currently breached to determine whether the increase in demand for VPN services still exists. When the VPN server determines that the critical threshold is no longer breached and is not in danger of being breached within the threshold amount of time, the VPN server 120 may determine that the increase in demand for VPN services has passed. In this case, the VPN server 120 may end suspension of utilization of the assigned exit IP address. In other words, the VPN server 120 may utilize the assigned exit IP address to retrieve data of interest for the user device 102 from the host device.

During suspension of utilization of the assigned exit IP address and during the established connection between the user device 102 and the VPN server 120, as shown by reference numeral 220, the VPN server 120 may initiate communication with a secondary server 118 to establish a secure connection between the VPN server 120 and the secondary server 118. In some aspects, the secondary server may include a dedicated server available to the VPN server 120 for processing data request (e.g., requesting and retrieving information (e.g., data of interest) from a host device). To enable the VPN server 120 to communicate with the secondary server 118, the control infrastructure may configure the VPN server 120 with communication information associated with the secondary server 118. Alternatively, based at least in part on predicting and/or determining the sudden increase in demand for VPN services, the VPN server 120 may transmit to the control infrastructure a request to receive the communication information associated with a secondary server 118. The VPN server 120 may utilize the communication information to initiate communication with the secondary server 118.

In some aspects, the secondary server 118 may be configured and maintained by the control infrastructure. Further, the control infrastructure and/or the VPN server 120 may select the secondary server 118, from among available secondary servers, to be utilized by the VPN server 120 to process the data request based at least in part on the secondary server 118 being optimal for processing the data request. In an example, the secondary server 118 may be optimal because the secondary server 118 may be reserved for the purpose of processing the request for the VPN server 120. In another example, the secondary server 118 may be optimal because the secondary server 118 may be located geographically/physically closer (and therefore able to provide speedier service) to the user device 102 and/or the VPN server 120. In yet another example, the secondary server 118 may be optimal because the secondary server 118 may currently have a highest available bandwidth, from among available secondary servers, to process the data request. In yet another example, the secondary server 118 may be optimal because the secondary server 118 may be located geographically/physically closer to an international Internet exchange hub (and therefore able to provide speedier service).

In some aspects, to enable speedy establishing of the secure connection, the control infrastructure 104 may pre-authenticate the VPN server 120 with the secondary server 118 and may pre-authenticate the secondary server 118 with the VPN server 120. Alternatively, the control infrastructure may enable authentication of the VPN server 120 with the secondary server 118 and authentication of the secondary server 118 with the VPN server 120 when the secure connection between the VPN server 120 and the secondary server 118 is to be established. The pre-authentication and/or the authentication of the servers (e.g., VPN server 120 and the secondary server 118) with each other may include the control infrastructure enabling exchange of authentication information associated with the servers. In an example, the control infrastructure may transmit communication information (e.g., public keys, IP address, port, etc.) and/or a public key associated with the VPN server 120 to the secondary server 118. Similarly, the control infrastructure may transmit communication information (e.g., public keys, IP address, port, etc.) and/or a public key associated with the secondary server 118 to the VPN server 120. The VPN server 120 and the secondary server may negotiate a protocol (e.g., Wireguard, OpenVPN, IKEv2, etc.) to be utilized by the VPN server 120 and the secondary server 118 to communicate over the secure connection. The control infrastructure may also provide the VPN server 120 and the secondary server 118 with pre-shared pair of alphanumeric strings, including a first alphanumeric string and a second alphanumeric string, to be utilized during establishment of the secure connection.

When the secure connection is to be established, the VPN server 120 (or the secondary server 118) may utilize the communication information associated with the secondary server 118 (or the VPN server 120) to initiate establishing of the secure connection. In some aspects, VPN server 120 may transmit an initiation IP packet (e.g., initiation message) to the secondary server 118 to establish the secure connection. Based at least in part on receiving the initiation IP packet, the secondary server 118 may examine information included in the initiation IP packet to determine whether the VPN server 120 and the secondary server 118 are authorized to establish the secure connection. In an example, the secondary server 118 may compare a source IP address and/or a source IP port indicated in the initiation IP packet with communication information received from the control infrastructure.

When the secondary server 118 determines that the source IP address and/or the source IP port indicated in the initiation IP packet matches (e.g., is the same as) at least a portion of the communication information received from the control infrastructure, the secondary server 118 may determine that the VPN server 120, that transmitted the initiation IP packet, and the secondary server 118 are authorized to establish a secure connection. Alternatively, when the secondary server 118 determines that the source IP address and/or the source IP port indicated in the initiation IP packet fails to match (e.g., is different from) the communication information received from the control infrastructure, the secondary server 118 may determine that the VPN server 120, that transmitted the initiation IP packet, and the secondary server 118 are not authorized to establish the secure connection.

To confirm that a malicious party is not using communication information of the VPN server 120 or of the secondary server 118, the VPN server 120 and the secondary server 118 may conduct an identity verification procedure to determine that each server is in possession of its own private key. In this way, the verification procedure enables the VPN server 120 to verify an identity of the secondary server 118 and enables the secondary server 118 to verify an identity of the VPN server 120. In some aspects, the control infrastructure may configure the VPN server 120 and the secondary server 118 to conduct the verification procedure.

The verification procedure may be initiated by the VPN server 120 or by the secondary server 118. Below is an example of the verification procedure being initiated by the secondary server 118. When the verification procedure is initiated by the VPN server 120, the VPN server 120 may perform the below actions performed by the secondary server 118 and vice versa.

The secondary server 118 may determine first validation data to be used during the verification procedure. In some aspects, the first validation data may include the first alphanumeric string included in the pair of pre-shared alphanumeric strings received from the control infrastructure. The secondary server 118 may sign the first alphanumeric string based at least in part on utilizing the private key associated with the secondary server 118. Further, the secondary server 118 may utilize the communication information associated with the VPN server 120 to transmit the signed first alphanumeric string to the VPN server 120.

Based at least in part on receiving the signed first alphanumeric string, the VPN server 120 may utilize the public key associated with the secondary server 118 to validate the signed first alphanumeric string. In an example, the VPN server 120 may utilize an association between the public key associated with the secondary server 118 and the private key associated with the secondary server 118 to validate the signed first alphanumeric string. In some aspects, the public key associated with the secondary server 118 may be mathematically related to the private key associated with the secondary server 118 such that information (e.g., an alphanumeric string) signed by utilizing the private key may be validated based at least in part on utilizing the public key, and information encrypted by utilizing the public key may be decrypted based at least in part on utilizing the private key.

When the validation is successful, the VPN server 120 may determine that the secondary server 118 is in possession of the private key associated with the secondary server 118. The VPN server 120 may also compare the first alphanumeric string previously received from the control infrastructure with the first alphanumeric string received from the secondary server 118. When the result of the comparison indicates that the previously received first alphanumeric string matches (e.g., is the same as) the first alphanumeric string received from the secondary server 118, the VPN server 120 may determine that the secondary server 118 is a secondary server that also received the pair of alphanumeric strings including the first alphanumeric string from the control infrastructure, thereby verifying the identity of the secondary server 118.

Based at least in part on verifying the identity of the secondary server 118, the VPN server 120 may determine second validation data to be used during the verification procedure. In some aspects, the second validation data may include the second alphanumeric string included in the pair of pre-shared alphanumeric strings received from the control infrastructure. The VPN server 120 may sign the second alphanumeric string based at least in part on utilizing the private key associated with the VPN server 120. Further, the VPN server 120 may utilize the communication information associated with the secondary server 118 to transmit the signed second alphanumeric string to the secondary server 118.

Based at least in part on receiving the signed second alphanumeric string, the secondary server 118 may utilize the public key associated with the VPN server 120 to validate the signed second alphanumeric string. In an example, the secondary server 118 may utilize an association between the public key associated with the VPN server 120 and the private key associated with the VPN server 120 to validate the signed second alphanumeric string. In some aspects, the public key associated with the VPN server 120 may be mathematically related to the private key associated with the VPN server 120 such that information (e.g., an alphanumeric string) signed by utilizing the private key may be validated based at least in part on utilizing the public key, and information encrypted by utilizing the public key may be decrypted based at least in part on utilizing the private key.

When the validation is successful, the secondary server 118 may determine that the VPN server 120 is in possession of the private key associated with the VPN server 120. The secondary server 118 may also compare the second alphanumeric string previously received from the control infrastructure with the second alphanumeric string received from the VPN server 120. When the result of the comparison indicates that the previously received second alphanumeric string matches (e.g., is the same as) the second alphanumeric string received from the VPN server 120, the secondary server 118 may determine that the VPN server 120 is a server that also received the pair of alphanumeric strings including the second alphanumeric string from the control infrastructure, thereby verifying the identity of the VPN server 120. At this stage, the verification procedure may be successfully complete.

Based at least in part on successful completion of the verification procedure, the secondary server 118 (or the VPN server 120) may determine a symmetric cryptographic key to be utilized by the VPN server 120 and the secondary server 118 to encrypt and/or decrypt the data transmitted over the secure connection. In some aspects, the secondary server 118 may determine the cryptographic key based at least in part on combining the public key associated with the VPN server 120, the public key associated with the secondary server 118, and/or a randomly generated number. In some aspects, the cryptographic key may be determined based at least in part on utilizing a key derivation algorithm to combine the public key associated with the VPN server 120, the public key associated with the secondary server 118, and/or the randomly generated number.

Further, the secondary server 118 may encrypt the cryptographic key based at least in part on utilizing the public key associated with the VPN server 120. The secondary server 118 may utilize the communication information associated with the VPN server 120 to transmit the encrypted cryptographic key to the VPN server 120.

Based at least in part on receiving the encrypted cryptographic key, the VPN server 120 may utilize a private key associated with the VPN server 120 to decrypt the encrypted cryptographic key. Because the cryptographic key was encrypted by utilizing the public key associated with the VPN server 120, the VPN server 120 may successfully decrypt the encrypted cryptographic key by utilizing the private key associated with the VPN server 120. Based at least in part on decrypting the encrypted cryptographic key, the VPN server 120 may determine the cryptographic key. At this stage, both the VPN server 120 and the secondary server 118 may possess the cryptographic key to be utilized for secure communication of data between the VPN server 120 and the secondary server 118. In this way, the secure connection may be established between the VPN server 120 and the secondary server 118. In some aspects, to enable improved security, the secondary server 118 (or the VPN server 120) may periodically determine and transmit a new symmetric cryptographic key to the VPN server 120 in a similar and/or analogous manner, as discussed above.

Based at least in part on the secure connection being established, the VPN server 120 may modify the configuration file and/or the configuration database related to the associated DNS server. In some aspects, the modification to the configuration file and/or the configuration database may include an association between critical threshold and the secondary server 118. In an example, the VPN server 120 may modify the configuration file and/or the configuration database such that, for at least a number of data requests being processed after the VPN server 120 has predicted and/or determined the breach of the critical threshold, the DNS server returns the communication information (e.g., IP address) associated with the secondary server 118 rather than returning communication information associated with the host device. As a result, this number of data requests may automatically, and in real time, be encrypted and transmitted to the secondary server 118 over the established secure connection between the VPN server 120 and the secondary server 118. In this way, the VPN server 120 and the secondary server 118 may share processing of data requests to avoid the critical threshold being breached and/or the VPN server 120 becoming overloaded.

As shown by reference numeral 225, the VPN server 120 may again process the data request by transmitting, during the established VPN connection between the VPN server 120 and the user device 102, an encrypted message to the secondary server 118 via the secure connection. The encrypted message may include the data request identifying the data of interest to be retrieved and/or the communication information associated with the host device indicating that the data of interest is to be retrieved from the host device. In some aspects, the encrypted message may include an unsecure IP packet. In this case, the VPN server 120 may include the communication information in a request line included in the unsecure IP packet. The data request may be included in a payload of the unsecure IP packet. In some aspects, the message may include a secure IP packet. In this case, the VPN server 120 may configure the secure IP packet to include a server name indication (SNI) header, and may include the communication information within the SNI header. The data request may be included in a payload of the secure IP packet.

Based at least in part on receiving the encrypted message, the secondary server 118 may decrypt the encrypted message to determine the IP packet. In some aspects, the secondary server 118 may analyze the payload of the IP packet to determine the data request identifying the data of interest. In some aspects, the secondary server 118 may determine whether the message includes the unsecure IP packet or a secure IP packet. When the secondary server 118 determines that the message includes an unsecure IP packet, the secondary server 118 may analyze the request line to determine the communication information associated with the host device. Alternatively, when the secondary server 118 determines that the message includes a secure IP packet, the secondary server 118 may analyze the SNI header to determine the communication information associated with the host device.

Further, the secondary server 118 may assign a new exit IP address (e.g., second exit IP address) for retrieving the data of interest from the host device. The new exit IP address may be selected from a pool of exit IP addresses available to the secondary server 118. In some aspects, the secondary server 118 may randomly or sequentially select the new exit IP address from the pool of exit IP addresses, in a similar and/or analogous manner as discussed elsewhere herein. Based at least in part on determining the data of interest and/or the communication information associated with the host device and/or the new exit IP address, the secondary server 118 may utilize the new exit IP address to transmit a query to the host device for the purpose of retrieving the data of interest. Based at least in part on receiving the query from the secondary server 118, the host device may provide the data of interest to the secondary server 118.

Based at least in part on retrieving the data of interest from the host device, the secondary server 118 may transmit the data of interest to the VPN server 120. In some aspects, the secondary server 118 may encrypt the data of interest prior to transmitting the data of interest to the VPN server 120 over the secure connection between the VPN server 120 and the secondary server 118. In some aspects, in association with the data of interest, the secondary server 118 may transmit information identifying the new exit IP address utilized to retrieve the data of interest from the host device.

Based at least in part on receiving the information identifying the new exit IP address, the VPN server 120 may add a positive correlation between the new exit IP address and the host device to indicate that the new exit IP address, associated with the secondary server 118, may be utilized and/or is available to be utilized to retrieve information (e.g., data of interest, etc.) from the host device. Additionally, the VPN server 120 may add a correlation between the new exit IP address associated with the secondary server 118 and the entry IP address utilized by the user device 102 to transmit the data request. In some aspects, the correlation between the entry IP address and the new exit IP address may be privately or internally stored within the VPN server 120 in, for example, the connection tracking table. Based at least in part on the receiving the data of interest, the VPN server 120 may inspect the connection tracking table to determine the routing of the received data of interest. In this case, the correlation between the entry IP address and the new exit IP address may indicate that the data of interest, that was retrieved by utilizing the new exit IP address, is to be routed to the user device 102, which transmitted the data request utilizing the entry IP address of the VPN server 120. Further, based at least in part on a correlation between the entry IP address and the new exit IP address, as shown by reference numeral 230, the VPN server 120 may transmit the received data of interest to the user device 102.

In some aspects, the VPN server 120 may receive a second data request from the user device 102 (or another user device 102) during the operation period. In this case, the VPN server 120 may utilize the assigned exit IP address to process the second data request when the VPN server 120 determines that the critical threshold is not breached due to the second data request. Alternatively, the VPN server 120 may utilize the new exit IP address associated with the secondary server 118 to process the second data request when the VPN server 120 predicts and/or determines the breach of the critical threshold due to the second data request.

By establishing a secure connection with a secondary server, the VPN server may enable dynamic management of VPN devices (e.g., VPN server 120, secondary server 118, control infrastructure 104, etc.). In this way, the control infrastructure and/or the primary VPN server may enable automatic and real time processing of data requests without, among other things, having to conduct restorative operations to manage reduction in an amount of available bandwidth and/or damage to the VPN server while enabling connected user devices to receive the data of interest without, among other things, disconnecting established VPN connections and reestablishing new VPN connections. As a result, the control infrastructure and/or the primary VPN server may enable efficient utilization of user device resources (e.g., processing resources, memory resources, power consumption resources, battery life, or the like) and VPN resources (computational resources, network bandwidth, management resources, processing resources, memory resources, or the like) for performing suitable tasks associated with the VPN.

As indicated above, FIG. 2 is provided as an example. Other examples may differ from what is described with regard to FIG. 2.

FIG. 3 is an illustration of an example 300 associated with dynamic management of servers based on environmental events, according to various aspects of the present disclosure. As shown in FIG. 3, the primary server 120 may include a processing unit (e.g., processor 820), which may include and/or utilize a self-learning machine learning model (ML model) 310 in connection with the dynamic management of servers. In some aspects, the ML model 310 may include a supervised learning model. In some aspects, the ML model 310 may include an unsupervised learning model. The processing unit 820 may utilize the ML model 310 to determine a need to perform an action related to the dynamic management of servers.

As shown by reference numeral 320, the ML model 310 may obtain training data including metadata and/or previous metadata associated with information received during at least one previous instance of dynamic management of servers and/or update data associated with an output provided by the ML model 310 during at least one previous instance of dynamic management of servers. In some aspects, the training data may include collected environmental data, determined patterns based at least in part on analyzing the environmental data, predicted and/or determined breaches of a critical threshold based at least in part on the determined patterns, as discussed elsewhere herein. In some aspects, the processing unit 820 may store the above training data in, and the ML model 310 may obtain the above training data from, for example, one or more memories (e.g., memory 830) associated with the primary server 120. In some aspects, the previous metadata may include historical metadata associated with the at least one previous instance of dynamic management of servers. In some aspects, the update data may include historical output data associated with at least one previous instance of dynamic management of servers. In some aspects, the ML model 310 may obtain input training data that is input via an interface associated with the primary server 120.

As shown by reference number 330, the ML model 310 may process the training data using a machine learning algorithm (ML algorithm). In some aspects, the ML model 310 may utilize the ML algorithm to evaluate the training data to learn trends and patterns associated with dynamic management of VPN devices. In some aspects, the ML algorithm may evaluate and take into account feedback information (e.g., success rate) associated with previous dynamic management of servers (e.g., previous collection of environmental data, analysis of environmental data to determine patters, and/or prediction and/or determination of breaches of the critical threshold based at least in part on the determined patterns). The ML algorithm may provide output data to the processing unit 106 based at least in part on the evaluated training data and the learned trends and patterns. In some aspects, the output data may indicate a value associated with the likelihood that the breach was successfully predicted and/or determined, thereby assisting in more accurate dynamic management of servers.

As shown by reference number 340, at an end of an instance of dynamic management of VPN devices, the ML model 310 may receive update data including at least the training data and/or the output data. In some aspects, the update data may be included in the previous metadata stored in the one or more memories (e.g., memory 830) to be used as training data for future iterations of dynamic management of servers. In some aspects, the ML model 310 may evaluate the update data to learn various aspects such as accuracy, consistency, reliability, efficiency, and/or the like of the output data to enable more accurate dynamic management of servers. In this way, the processing unit 820 may utilize the ML model 310 to apply a rigorous and automated process to enable dynamic management of servers. In some aspects, the processing unit 820 may more accurately determine patterns based at least in part on analyzing the environmental data and/or more accurately predict and/or determine breaches of a critical threshold based at least in part on the determined patterns.

As indicated above, FIG. 3 is provided as an example. Other examples may differ from what is described in connection with FIG. 3.

FIG. 4 is an illustration of an example process 400 associated with dynamic management of servers based on environmental events, according to various aspects of the present disclosure. In some aspects, the process 400 may be performed by an associated memory (e.g., memory 830) and/or an associated processor (e.g., processor 820) related to a VPN server (e.g., VPN server 120) configured by an associated control infrastructure. As shown by reference numeral 410, process 400 includes utilizing, by a VPN server during an established VPN connection between the VPN server and a user device, a first exit internet protocol (IP) address to transmit a first query to a host device for retrieving data of interest requested by the user device. For instance, the VPN server may utilize the associated memory and/or processor to utilize, during an established VPN connection between the VPN server and a user device, a first exit internet protocol (IP) address to transmit a first query to a host device for retrieving data of interest requested by the user device, as discussed elsewhere herein.

As shown by reference numeral 420, process 400 includes predicting or determining, by the VPN server during the established VPN connection, potential overloading of the VPN server based at least in part on predicting or determining a breach of a critical threshold associated with the VPN. For instance, the VPN server may predict or determine, during the established VPN connection, potential overloading of the VPN server based at least in part on predicting or determining a breach of a critical threshold associated with the VPN, as discussed elsewhere herein.

As shown by reference numeral 430, process 400 includes establishing, by the VPN server during the established VPN connection and based at least in part on predicting or determining a breach, a secure connection with a secondary server to enable communication of encrypted information between the VPN server and the secondary server. For instance, the VPN server may utilize the associated memory and/or processor to establish, during the established VPN connection and based at least in part on predicting or determining a breach, a secure connection with a secondary server to enable communication of encrypted information between the VPN server and the secondary server, as discussed elsewhere herein.

As shown by reference numeral 440, process 400 transmitting, by the VPN server during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address. For instance, the VPN server may utilize an associated communication interface (e.g., communication interface 870) with the associated memory and/or processor to transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address, as discussed elsewhere herein.

Process 400 may include additional aspects, such as any single aspect or any combination of aspects described below and/or in connection with one or more other processes described elsewhere herein.

In a first aspect, in process 400, predicting or determining the potential overloading of the VPN server includes predicting or determining that a rate of increase in an amount of user devices establishing VPN connections with the VPN server satisfies a critical number of user devices that the VPN server is configured to serve.

In a second aspect, alone or in combination with the first aspect, in process 400, predicting or determining the potential overloading of the VPN server includes predicting or determining that a rate of increase in an amount of throughput processed by the VPN server satisfies a critical amount of throughput that the VPN server is configured to process.

In a third aspect, alone or in combination with the first through second aspects, process 400 may include modifying, by the VPN server based at least in part on predicting or determining the potential overloading, a configuration of an associated domain name system (DNS) server such that the DNS server returns communication information associated with the secondary server for at least a portion of data requests being processed.

In a fourth aspect, alone or in combination with the first through third aspects, process 400 may include determining, by the VPN server, a cryptographic key based at least in part on a public key associated with the VPN server and a public key associated with the secondary server, the cryptographic key to be utilized for encrypting information communicated between the VPN server and the secondary server.

In a fifth aspect, alone or in combination with the first through fourth aspects, process 400 may include receiving, by the VPN server from the secondary server during the established VPN connection, the data of interest retrieved from the host device based at least in part on utilizing the second exit IP address; and transmitting, by the VPN server during the established VPN connection, the data of interest to the user device.

In a sixth aspect, alone or in combination with the first through fifth aspects, process 400 may include verifying an identity of the secondary server prior to transmitting the encrypted message.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with dynamic management of servers based on environmental events, according to various aspects of the present disclosure. In some aspects, the process 500 may be performed by an associated memory (e.g., memory 830) and/or an associated processor (e.g., processor 820) related to a VPN server (e.g., VPN server 120) configured by an associated control infrastructure. As shown by reference numeral 510, process 500 may include predicting or determining, by a VPN server, potential overloading of the VPN server based at least in part on predicting or determining a breach of a critical threshold associated with the VPN server. For instance, the VPN server may utilize the associated memory and/or processor to predict or determine potential overloading of the VPN server based at least in part on predicting or determining a breach of a critical threshold associated with the VPN server, as discussed elsewhere herein.

As shown by reference numeral 520, process 500 includes verifying, by the VPN server based at least in part on predicting or determining the potential overloading, an identity of a secondary server with which the VPN server is authorized to establish a secure connection. For instance, the VPN server may utilize the associated memory and/or processor to verify, based at least in part on predicting or determining the potential overloading, an identity of a secondary server with which the VPN server is authorized to establish a secure connection, as discussed elsewhere herein.

As shown by reference numeral 530, process 500 includes establishing, by the VPN server based at least in part on verifying the identity of the secondary server, a secure connection with the secondary server to enable communication of encrypted information between the VPN server and the secondary server. For instance, the VPN server may utilize the associated memory and/or processor to establish, based at least in part on verifying the identity of the secondary server, a secure connection with the secondary server to enable communication of encrypted information between the VPN server and the secondary server, as discussed elsewhere herein.

As shown by reference numeral 540, process 500 transmitting, by the VPN server to the secondary server over the secure connection, an encrypted message identifying a host device and data of interest to be retrieved from the host device to enable the secondary server to request the data of interest from the host device. For instance, the VPN server may utilize an associated communication interface (communication interface 870), memory, and/or processor to transmit, to the secondary server over the secure connection, an encrypted message identifying a host device and data of interest to be retrieved from the host device to enable the secondary server to request the data of interest from the host device, as discussed elsewhere herein.

Process 500 may include additional aspects, such as any single aspect or any combination of aspects described below and/or in connection with one or more other processes described elsewhere herein.

In a first aspect, wherein, in process 500, predicting or determining the breach of the critical threshold includes predicting or determining that a rate of increase in an amount of user devices establishing VPN connections with the VPN server satisfies a critical number of user devices that the VPN server is configured to serve.

In a second aspect, alone or in combination with the first aspect, in process 500, predicting or determining the breach of the critical threshold includes predicting or determining that a rate of increase in an amount of throughput processed by the VPN server satisfies a critical amount of throughput that the VPN server is configured to process.

In a third aspect, alone or in combination with the first through second aspects, in process 500, verifying the identity of the secondary server includes verifying that the secondary server is in possession of a private key associated with the secondary server.

In a fourth aspect, alone or in combination with the first through third aspects, process 500 may include modifying, based at least in part on predicting or determining the potential overloading of the VPN server, a configuration of an associated domain name system (DNS) server such that the DNS server returns communication information associated with the secondary server for at least a portion of data requests being processed.

In a fifth aspect, alone or in combination with the first through fourth aspects, process 500 includes determining a cryptographic key based at least in part on a public key associated with the VPN server and a public key associated with the secondary server, the cryptographic key to be utilized for encrypting information communicated over the secure connection between the VPN server and the secondary server.

In a sixth aspect, alone or in combination with the first through fifth aspects, process 500 may include receiving, from the secondary server, the data of interest retrieved from the host device by the secondary server; and transmitting the data of interest to a user device that requested the data of interest from the VPN server.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with dynamic management of servers based on environmental events, according to various aspects of the present disclosure. In some aspects, the process 600 may be performed by an associated memory (e.g., memory 830) and/or an associated processor (e.g., processing unit 110, processor 820) related to a control infrastructure configured to configure an associated VPN server (e.g., VPN server 120). As shown by reference numeral 610, process 600 includes configuring a VPN server to utilize, during an established VPN connection between the VPN server and a user device, a first exit internet protocol (IP) address to transmit a first query to a host device for retrieving data of interest requested by the user device. For instance, the control infrastructure may utilize the associated memory and/or processor to configure a VPN server to utilize, during an established VPN connection between the VPN server and a user device, a first exit internet protocol (IP) address to transmit a first query to a host device for retrieving data of interest requested by the user device, as discussed elsewhere herein.

As shown by reference numeral 620, process 600 includes configuring the VPN server to predict or determine, during the established VPN connection, potential overloading of the VPN server based at least in part on predicting or determining a breach of a critical threshold associated with the VPN server. For instance, the control infrastructure may utilize the associated memory and/or processor to configure the VPN server to predict or determine, during the established VPN connection, potential overloading of the VPN server based at least in part on predicting or determining a breach of a critical threshold associated with the VPN server, as discussed elsewhere herein.

As shown by reference numeral 630, process 600 includes configuring the VPN server to establish, during the established VPN connection and based at least in part on predicting or determining a breach, a secure connection with a secondary server to enable communication of encrypted information between the VPN server and the secondary server. For instance, the control infrastructure may utilize the associated memory and/or processor to configure the VPN server to establish, during the established VPN connection and based at least in part on predicting or determining a breach, a secure connection with a secondary server to enable communication of encrypted information between the VPN server and the secondary server, as discussed elsewhere herein.

As shown by reference numeral 640, process 600 includes configuring the VPN server to transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address. For instance, the control infrastructure may utilize the associated memory and/or processor to configure the VPN server to transmit, during the established VPN connection and to the secondary server over the secure connection, an encrypted message identifying the host device and the data of interest to be retrieved from the host device to enable the secondary server to transmit a second query to request the data of interest based at least in part on utilizing a second exit IP address, different from the first exit IP address, as discussed elsewhere herein.

Process 600 may include additional aspects, such as any single aspect or any combination of aspects described below and/or in connection with one or more other processes described elsewhere herein.

In a first aspect, wherein, in process 600, configuring the VPN server to predict or determine the potential overloading of the VPN server includes configuring the VPN server to predict or determine that a rate of increase in an amount of user devices establishing VPN connections with the VPN server satisfies a critical number of user devices that the VPN server is configured to serve.

In a second aspect, alone or in combination with the first aspect, in process 600, configuring the VPN server to predict or determine the potential overloading of the VPN server includes configuring the VPN server to predict or determine that a rate of increase in an amount of throughput processed by the VPN server satisfies a critical amount of throughput that the VPN server is configured to process.

In a third aspect, alone or in combination with the first through second aspects, process 600 may include configuring the VPN server to modify, based at least in part on predicting or determining the potential overloading, a configuration of an associated domain name system (DNS) server such that the DNS server returns communication information associated with the secondary server for at least a portion of data requests being processed.

In a fourth aspect, alone or in combination with the first through third aspects, process 600 may include configuring the VPN server to determine a cryptographic key based at least in part on a public key associated with the VPN server and a public key associated with the secondary server, the cryptographic key to be utilized for encrypting information communicated between the VPN server and the secondary server.

In a fifth aspect, alone or in combination with the first through fourth aspects, process 600 may include configuring the VPN server to receive, from the secondary server during the established VPN connection, the data of interest retrieved from the host device based at least in part on utilizing the second exit IP address; and configuring the VPN server to transmit, during the established VPN connection, the data of interest to the user device.

In a sixth aspect, alone or in combination with the first through fifth aspects, process 600 may include configuring the VPN server to verify an identity of the secondary server prior to transmitting the encrypted message.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with dynamic management of servers based on environmental events, according to various aspects of the present disclosure. In some aspects, the process 700 may be performed by an associated memory (e.g., memory 830) and/or an associated processor (e.g., processing unit 110, processor 820) related to a control infrastructure configured to configure an associated VPN server (e.g., VPN server 120). As shown by reference numeral 710, process 700 includes configuring a VPN server to predict or determine potential overloading of the VPN server based at least in part on predicting or determining a breach of a critical threshold associated with the VPN server. For instance, the control infrastructure may utilize the associated memory and/or processor to configure a VPN server to predict or determine potential overloading of the VPN server based at least in part on predicting or determining a breach of a critical threshold associated with the VPN server, as discussed elsewhere herein.

As shown by reference numeral 720, process 700 includes configuring the VPN server to verify, based at least in part on predicting or determining the potential overloading, an identity of a secondary server with which the VPN server is authorized to establish a secure connection. For instance, the control infrastructure may utilize the associated memory and/or processor to configure the VPN server to verify, based at least in part on predicting or determining the potential overloading, an identity of a secondary server with which the VPN server is authorized to establish a secure connection, as discussed elsewhere herein.

As shown by reference numeral 730, process 700 includes configuring the VPN server to establish, based at least in part on verifying the identity of the secondary server, a secure connection with the secondary server to enable communication of encrypted information between the VPN server and the secondary server. For instance, the control infrastructure may utilize the associated memory and/or processor to configure the VPN server to establish, based at least in part on verifying the identity of the secondary server, a secure connection with the secondary server to enable communication of encrypted information between the VPN server and the secondary server, as discussed elsewhere herein.

As shown by reference numeral 740, process 700 includes configuring the VPN server to transmit, to the secondary server over the secure connection, an encrypted message identifying a host device and data of interest to be retrieved from the host device to enable the secondary server to request the data of interest from the host device. For instance, the control infrastructure may utilize the associated memory and/or processor to configure the VPN server to transmit, to the secondary server over the secure connection, an encrypted message identifying a host device and data of interest to be retrieved from the host device to enable the secondary server to request the data of interest from the host device, as discussed elsewhere herein.

Process 700 may include additional aspects, such as any single aspect or any combination of aspects described below and/or in connection with one or more other processes described elsewhere herein.

In a first aspect, wherein, in process 700, configuring the VPN server to predict or determine the breach of the critical threshold includes configuring the VPN server to predict or determine that a rate of increase in an amount of user devices establishing VPN connections with the VPN server satisfies a critical number of user devices that the VPN server is configured to serve.

In a second aspect, alone or in combination with the first aspect, in process 700, configuring the VPN server to predict or determine the breach of the critical threshold includes configuring the VPN server to predict or determine that a rate of increase in an amount of throughput processed by the VPN server satisfies a critical amount of throughput that the VPN server is configured to process.

In a third aspect, alone or in combination with the first through second aspects, in process 700, configuring the VPN server to verify the identity of the secondary server includes configuring the VPN server to verify that the secondary server is in possession of a private key associated with the secondary server.

In a fourth aspect, alone or in combination with the first through third aspects, process 700 may include configuring the VPN server to modify, based at least in part on predicting or determining the potential overloading of the VPN server, a configuration of an associated domain name system (DNS) server such that the DNS server returns communication information associated with the secondary server for at least a portion of data requests being processed.

In a fifth aspect, alone or in combination with the first through fourth aspects, process 700 may include configuring the VPN server to determine a cryptographic key based at least in part on a public key associated with the VPN server and a public key associated with the secondary server, the cryptographic key to be utilized for encrypting information communicated over the secure connection between the VPN server and the secondary server.

In a sixth aspect, alone or in combination with the first through fifth aspects, process 700 may include configuring the VPN server to receive, from the secondary server, the data of interest retrieved from the host device by the secondary server; and configuring the VPN server to transmit the data of interest to a user device that requested the data of interest from the VPN server.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800, according to various aspects of the present disclosure. In some aspects, the example devices 800 may form part of or implement the systems, environments, infrastructures, components, devices or the like described elsewhere herein (e.g., user device, primary server, the control infrastructure, etc.) and may be utilized for performing the example processes described elsewhere herein. The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The claims are as follows:

1. A virtual private network (VPN) server, comprising:
a memory; and
a processor communicatively coupled to the memory, the memory and the processor being configured to:
predict potential overloading of the VPN server based at least in part on predicting a potential breach of a critical threshold associated with the VPN server;
verify, based at least in part on predicting the potential overloading, an identity of a secondary server with which the VPN server is authorized to establish a secure connection;
establish, based at least in part on verifying the identity of the secondary server, a secure connection with the secondary server to enable communication of encrypted information between the VPN server and the secondary server; and
transmit, to the secondary server over the secure connection, an encrypted message identifying a host device and data of interest to be retrieved from the host device to enable the secondary server to request the data of interest from the host device.

2. The VPN server of claim 1, wherein, to predict the potential overloading of the VPN server, the memory and the processor are configured to predict that a rate of increase in an amount of user devices establishing VPN connections with the VPN server satisfies a critical number of user devices that the VPN server is configured to serve.

3. The VPN server of claim 1, wherein, to predict the potential overloading of the VPN server, the memory and the processor are configured to predict that a rate of increase in an amount of throughput processed by the VPN server satisfies a critical amount of throughput that the VPN server is configured to process.

4. The VPN server of claim 1, wherein, to verify the identity of the secondary server, the memory and the processor are configured to verify that the secondary server is in possession of a private key associated with the secondary server.

5. The VPN server of claim 1, wherein the memory and the processor are configured to:
modify, based at least in part on predicting the potential overloading of the VPN server, a configuration of an associated domain name system (DNS) server such that the DNS server returns communication information associated with the secondary server for at least a portion of data requests being processed.

6. The VPN server of claim 1, wherein the memory and the processor are configured to:
determine a cryptographic key based at least in part on a public key associated with the VPN server and a public key associated with the secondary server, the cryptographic key to be utilized for encrypting information communicated over the secure connection between the VPN server and the secondary server.

7. The VPN server of claim 1, wherein the memory and the processor are configured to:
receive, from the secondary server, the data of interest retrieved from the host device by the secondary server; and
transmit the data of interest to a user device that requested the data of interest from the VPN server.

8. A method in a virtual private network (VPN), the method comprising:
- predicting, by a VPN server, potential overloading of the VPN server based at least in part on predicting a potential breach of a critical threshold associated with the VPN server;
- verifying, by the VPN server based at least in part on predicting the potential overloading, an identity of a secondary server with which the VPN server is authorized to establish a secure connection;
- establishing, by the VPN server based at least in part on verifying the identity of the secondary server, a secure connection with the secondary server to enable communication of encrypted information between the VPN server and the secondary server; and
- transmitting, by the VPN server to the secondary server over the secure connection, an encrypted message identifying a host device and data of interest to be retrieved from the host device to enable the secondary server to request the data of interest from the host device.

9. The method of claim 8, wherein predicting the potential overloading of the critical threshold includes predicting that a rate of increase in an amount of user devices establishing VPN connections with the VPN server satisfies a critical number of user devices that the VPN server is configured to serve.

10. The method of claim 8, wherein predicting the potential overloading of the critical threshold includes predicting that a rate of increase in an amount of throughput processed by the VPN server satisfies a critical amount of throughput that the VPN server is configured to process.

11. The method of claim 8, wherein verifying the identity of the secondary server includes verifying that the secondary server is in possession of a private key associated with the secondary server.

12. The method of claim 8, further comprising:
- modifying, based at least in part on predicting the potential overloading of the VPN server, a configuration of an associated domain name system (DNS) server such that the DNS server returns communication information associated with the secondary server for at least a portion of data requests being processed.

13. The method of claim 8, further comprising:
- determining a cryptographic key based at least in part on a public key associated with the VPN server and a public key associated with the secondary server, the cryptographic key to be utilized for encrypting information communicated over the secure connection between the VPN server and the secondary server.

14. The method of claim 8, further comprising:
- receiving, from the secondary server, the data of interest retrieved from the host device by the secondary server; and
- transmitting the data of interest to a user device that requested the data of interest from the VPN server.

15. A non-transitory computer-readable medium configured to store instructions, which when executed by a processor associated with a virtual private network (VPN) server, configure the processor to:
- predict potential overloading of the VPN server based at least in part on predicting a potential breach of a critical threshold associated with the VPN server;
- verify, based at least in part on predicting the potential overloading, an identity of a secondary server with which the VPN server is authorized to establish a secure connection;
- establish, based at least in part on verifying the identity of the secondary server, a secure connection with the secondary server to enable communication of encrypted information between the VPN server and the secondary server; and
- transmit, to the secondary server over the secure connection, an encrypted message identifying a host device and data of interest to be retrieved from the host device to enable the secondary server to request the data of interest from the host device.

16. The non-transitory computer-readable medium of claim 15, wherein, to predict the potential overloading of the VPN server, the processor is configured to predict that a rate of increase in an amount of user devices establishing VPN connections with the VPN server satisfies a critical number of user devices that the VPN server is configured to serve.

17. The non-transitory computer-readable medium of claim 15, wherein, to predict the potential overloading of the VPN server, the processor is configured to predict that a rate of increase in an amount of throughput processed by the VPN server satisfies a critical amount of throughput that the VPN server is configured to process.

18. The non-transitory computer-readable medium of claim 15, wherein, to verify the identity of the secondary server, the processor is configured to verify that the secondary server is in possession of a private key associated with the secondary server.

19. The non-transitory computer-readable medium of claim 15, wherein the processor is configured to:
- modify, based at least in part on predicting the potential overloading of the VPN server, a configuration of an associated domain name system (DNS) server such that the DNS server returns communication information associated with the secondary server for at least a portion of data requests being processed.

20. The non-transitory computer-readable medium of claim 15, wherein the processor is configured to:
- determine a cryptographic key based at least in part on a public key associated with the VPN server and a public key associated with the secondary server, the cryptographic key to be utilized for encrypting information communicated over the secure connection between the VPN server and the secondary server.

* * * * *